US010050823B2

(12) United States Patent
Keum et al.

(10) Patent No.: US 10,050,823 B2
(45) Date of Patent: Aug. 14, 2018

(54) SYSTEM AND METHOD FOR PROVIDING DEVICE MANAGEMENT SERVICE TO ELECTRONIC DEVICE HAVING NO BROADBAND COMMUNICATION MODULE

(75) Inventors: Ji-Eun Keum, Suwon-si (KR); Hae-Young Jun, Anyang-si (KR); Jin-Wook Lee, Yongin-si (KR); Wuk Kim, Gwacheon-si (KR); Hun Lim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 896 days.

(21) Appl. No.: 12/669,756

(22) PCT Filed: Jul. 18, 2008

(86) PCT No.: PCT/KR2008/004218
§ 371 (c)(1),
(2), (4) Date: Jan. 19, 2010

(87) PCT Pub. No.: WO2009/011555
PCT Pub. Date: Jan. 22, 2009

(65) Prior Publication Data
US 2010/0199333 A1 Aug. 5, 2010

(30) Foreign Application Priority Data
Jul. 19, 2007 (KR) .................... 10-2007-0072368

(51) Int. Cl.
*G06F 15/173* (2006.01)
*H04L 12/24* (2006.01)

(52) U.S. Cl.
CPC ............ *H04L 41/00* (2013.01); *H04L 41/046* (2013.01)

(58) Field of Classification Search
CPC ..................................... H04L 41/00
(Continued)

(56) References Cited
U.S. PATENT DOCUMENTS

2003/0122856 A1* 7/2003 Hubbard ............... G06F 3/023
715/700
2004/0184063 A1* 9/2004 Baldwin ............... G06F 3/121
358/1.13
(Continued)

FOREIGN PATENT DOCUMENTS

EP 1 473 873 11/2004
EP 1 750 469 2/2007
(Continued)

OTHER PUBLICATIONS

Mikael Sjodin "Remote Monitoring and Control Using Mobile Phones Embedded Wireless Information Servers", Newline Information, Whitepaper, Nov. 2001.*
(Continued)

*Primary Examiner* — Vivek Srivastava
*Assistant Examiner* — Hermon Asres
(74) *Attorney, Agent, or Firm* — The Farrell Law Firm, P.C.

(57) ABSTRACT

Disclosed is a system for providing an electronic device with a DM service, including: a DM server for providing the electronic device with the DM service; and a wireless terminal capable of being directly connected to the DM server for establishing a DM session while cooperating with the electronic device, generating an MO used for managing the electronic device with reference to a DDF of the electronic device if the wireless terminal receives the DDF of the electronic device from the electronic device through the DM session, and transmitting the generated MO to the DM server.

9 Claims, 12 Drawing Sheets

(58) Field of Classification Search
USPC .......................................... 709/219; 719/315
See application file for complete search history.

(56) References Cited

U.S. PATENT DOCUMENTS

| | | | |
|---|---|---|---|
| 2005/0153741 A1* | 7/2005 | Chen | H04W 8/205 455/558 |
| 2006/0069743 A1* | 3/2006 | Oommen | H04W 80/00 709/217 |
| 2006/0153091 A1* | 7/2006 | Lin | H04L 43/0858 370/252 |
| 2006/0224712 A1 | 10/2006 | Aho | |
| 2006/0236325 A1* | 10/2006 | Rao | G06F 8/65 719/315 |
| 2006/0242305 A1 | 10/2006 | Alnas | |
| 2007/0019631 A1* | 1/2007 | Jang | H04L 29/06027 370/352 |
| 2008/0043726 A1* | 2/2008 | Herrero-Veron | H04W 8/18 370/352 |
| 2010/0199333 A1* | 8/2010 | Keum | H04L 41/00 726/4 |

FOREIGN PATENT DOCUMENTS

| | | |
|---|---|---|
| KR | 100687235 B1 | 2/2007 |
| WO | WO 2000/38370 | 6/2000 |
| WO | WO 2005/001665 | 1/2005 |
| WO | WO 2005/107217 | 11/2005 |
| WO | WO 2007/040324 A1 | 4/2007 |

OTHER PUBLICATIONS

Brad A. Myers "Using handhelds for wireless remote control of PCs and appliances", Interacting with Computers, Jul. 28, 2004.*

Nikos Georganopoulos et al., "A Framework for Dynamic Link and Network Layer Protocol Optimisation", 16th IST Mobile and Wireless Communications Summit, Jul. 1, 2007.

\* cited by examiner

| Information Element | Req | Type | Description |
|---|---|---|---|
| Message ID | Mandatory | String | Message identifier " DMServiceRequest " |
| Session ID | Mandatory | String | ID of the management session |
| Target | Mandatory | String | ID of target DM Dual Device |
| Source | Mandatory | String | ID of source Device(ELECTRONIC DEVICE) |
| Credential | Mandatory | String | ID/PW of source Device (ELECTRONIC DEVICE) |
| DevInfo | Optional | String | Device ID, Manufacture, Model, Language |

FIG.6

| Information Element | Req | Type | Description |
|---|---|---|---|
| Message ID | Mandatory | String | Message identifier " DMServiceResponse " |
| Session ID | Mandatory | String | ID of the management session |
| Target | Mandatory | String | ID of source Device(ELECTRONIC DEVICE) |
| Source | Mandatory | String | ID of target DM Dual Device |
| Credential | Mandatory | String | ID/PW of DM Dual Device |
| Result code | Mandatory | String | Result code of checking the authentication and capability |

FIG.7

| Information Element | Req | Type | Description |
|---|---|---|---|
| Message ID | Mandatory | String | Message identifier "DDFDeliver" |
| Session ID | Mandatory | String | ID of the management session |
| DDFDATA | Mandatory | String | Contents data of DDF |

FIG.8

| Information Element | Req | Type | Description |
|---|---|---|---|
| Message ID | Mandatory | String | Message identifier " DMServiceRsponse " |
| Session ID | Mandatory | String | ID of the management session |
| Result code | Mandatory | String | Result code of Delivering DDF |

FIG.9

| Information Element | Req | Type | Description |
|---|---|---|---|
| Message ID | Mandatory | String | Message identifier " SubDMClientMO " |
| Session ID | Mandatory | String | ID of the management session |
| SubDMClientMO | Mandatory | String | Contents data of SubDMClientMO |

FIG.10

SYSTEM AND METHOD FOR PROVIDING DEVICE MANAGEMENT SERVICE TO ELECTRONIC DEVICE HAVING NO BROADBAND COMMUNICATION MODULE

TECHNICAL FIELD

The present invention relates to a technology providing the electronic devices with a standardized Open Mobile Alliance (OMA) Device Management (DM) service without connecting to an internet network.

BACKGROUND ART

As the number of wireless terminals has been dramatically increased, a standardized method for managing the wireless devices has been required. In this respect, a mobile device management method was developed, in which a wireless carrier or a service provider can manage the firmware, software, parameters, or schedule of the terminal while wirelessly communicating with the terminals. Among the methods for mobile device management, the OMA DM developed by the Open Mobile Alliance establishing the application standard of the wireless devices is notable. The OMA DM reads, adds, changes, and executes the object of the wireless terminal using the DM protocol so as to manage the firmware, software, parameters, or the like, of the terminal.

In the OMA DM, a terminal management subject is defined in the form of a Management Object (MO). A DM client and a DM server transfers the MO therebetween using the DM protocol so as to manage the terminal. The MO is an interface of a data model in which the DM server and the DM client are accessible. Conventionally, in order to receive the OMA DM service, every electronic device should be directly connected to the DMS of the internet network as shown in FIG. 1.

FIG. 1 is a diagram illustrating a connecting relation between the electronic devices and the DM server in the conventional DM system. Referring to FIG. 1, the electronic devices 11 to 15 are connected to the DM server 10 and transmit/receive the MO to/from the DM server 10 using the DM protocol.

As such, in order to receive the mobile device management service in the DM system, a subject terminal can be connected to the DM server 10 through the wireless internet network.

DISCLOSURE

Technical Problem

However, since all electronic devices used around us cannot access the wireless internet, all electronic devices cannot access the DM server (hereinafter, referred to as "DMS") through the wireless internet. That is, every electronic device does not have a broadband communication module required for accessing the wireless internet. Therefore, a technology for providing the mobile device management service to the electronic device incapable of accessing the wireless internet has been required in the industry related to the art.

Technical Solution

Accordingly, the present invention has been made to solve the above-mentioned problems occurring in the prior art, and the present invention provides a system and a method for providing a device management service to an electronic device having no a broadband communication module through a wireless terminal capable of accessing a DM server, even though the electronic device cannot be directly connected to the DM server.

In accordance with an aspect of the present invention, there is provided a method for providing an electronic device with a Device Management (DM) service in a system comprising a DM server, a wireless terminal capable of being directly connected to the DM server, and at least one electronic device capable of being directly connected to the wireless terminal, the method including the steps of: requesting the DM service to the wireless terminal and receiving a response to the request of the DM service by the electronic device; establishing a DM session between the electronic device and the wireless terminal; transmitting a Device Description File (DDF) of the electronic device to the wireless terminal through the DM session by the electronic device; and generating a Management Object (MO) used for managing the electronic device with reference to the DDF of the electronic device and transmitting the generated MO to the DM server by the wireless terminal.

Advantageous Effects

A present invention enables a apparatus which does not directly communicate with the internet network to wirelessly receive the OMA DM service. There is a method for providing a compact-sized electronic device with the OMA-DM service in which the compact-sized electronic device, such as the conventional MP3 or the digital camera, is directly connected to the DM server of the internet network. However, every compact-sized electronic device has not been developed to be connected to the internet network. If the electronic device is directly connected to the DM server through the internet network, the licensed broadband is used, so that the user should pay the communication use charge to the service provider and the service delay in communication may occur. However, according to the present invention, the device is connected to the neighboring wireless communication device, such as a cellular phone having a function of the mobile DM server, so that the device can receive the DM service. That is, the inconvenience caused by the communication charges and the service delay can be solved.

Further, there is a method for receiving the DM service in which the user directly visits a current customer care center, but the method is inconvenient for the user. Therefore, the method according to the present invention can solve such an inconvenience and simultaneously the user can conveniently receive the DM service.

DESCRIPTION OF DRAWINGS

FIG. 6 is a diagram illustrating an example of elements of a DM service request message;

FIG. 7 is a diagram illustrating an example of inside elements of a DM response message;

FIG. 8 is a diagram illustrating an example of elements of a DDF deliver message;

FIG. 9 is a diagram illustrating an example of elements of a DDF deliver response message;

FIG. 10 is a diagram illustrating an example of elements included in a sub DM client MO transmission message;

MODE FOR INVENTION

Hereinafter, exemplary embodiments of the present invention will be described with reference to the accompanying drawings. In the following description of the present invention, a detailed description of known functions and configurations incorporated herein will be omitted when it may make the subject matter of the present invention rather unclear.

Figure 1:
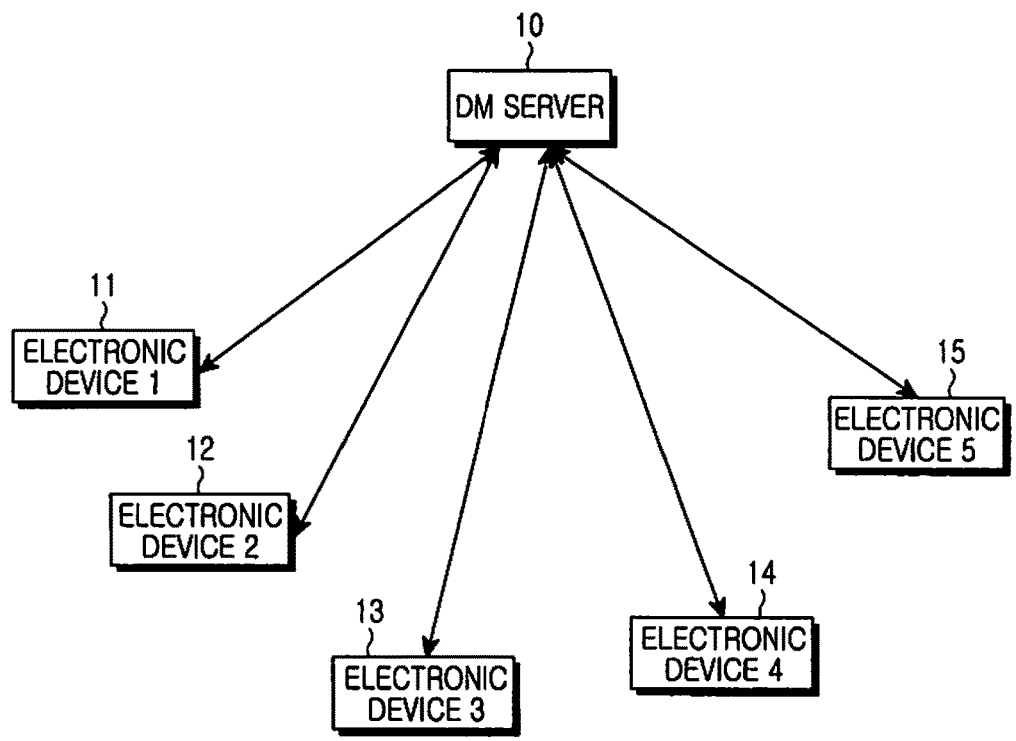
FIG. 1 is a diagram illustrating a connecting relation between the electronic devices and a DM server in the conventional DM system.
Figure 2:
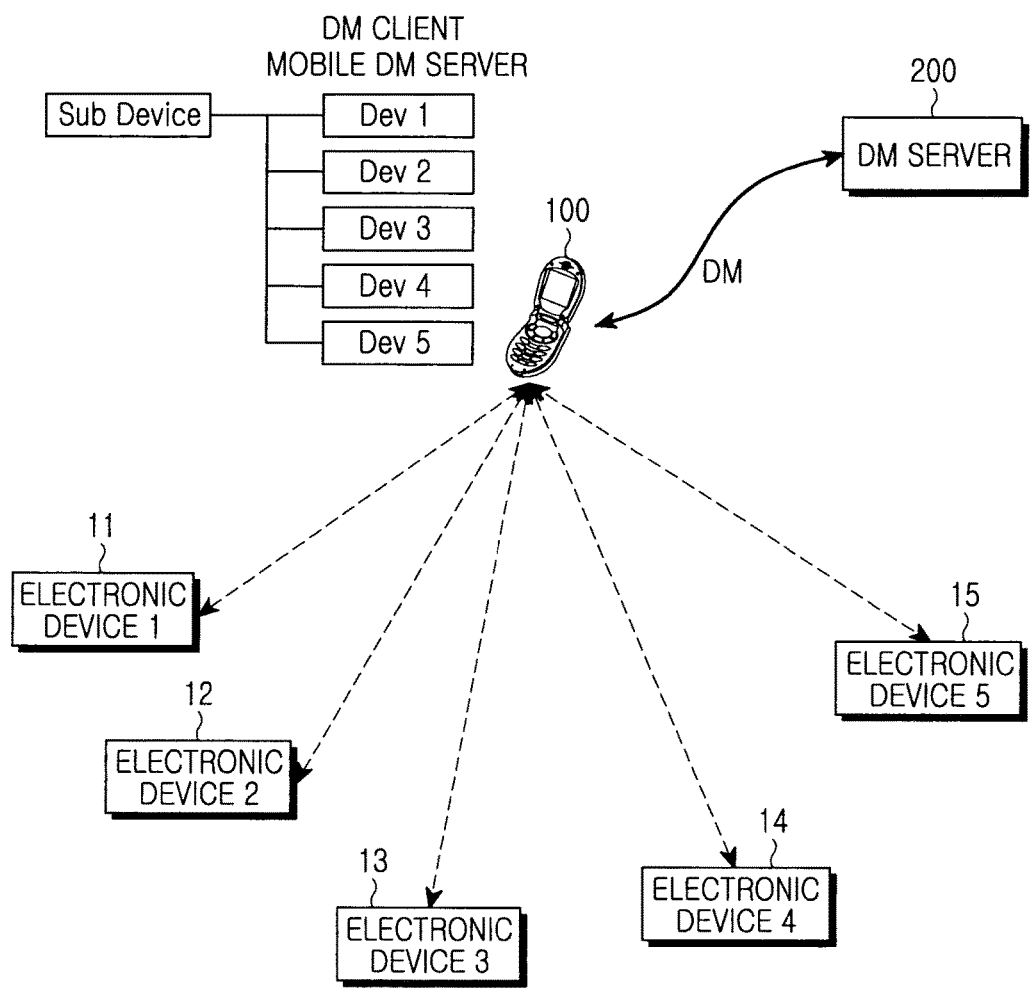
FIG. 2 is a diagram illustrating a system capable of providing a DM service to an electronic device according to an exemplary embodiment of the present invention.

FIG. 2 is a diagram illustrating a system capable of providing a Device Management (DM) service to an electronic device according to an exemplary embodiment of the present invention.

A system for providing the electronic device with the DM service according to the present invention includes a DM server for providing the electronic device with the DM service and a wireless terminal capable of being directly connected to the DM server, for establishing a DM session while cooperating with the electronic device, generating a Management Object (MO) used for managing the electronic device with referring to a Device Description File (DDF) of the electronic device if the wireless terminal receives the DDF of the electronic device from the electronic device through the DM session, and transmitting the generated MO to the DM server.

In the present invention, the wireless terminal capable of being connected to the DM server is used as a mobile DM server in order to provide at least one electronic device incapable of being connected to the DM server with the DM service. Here, the electronic devices include camcorders, PDAs, facsimile machines, MP3 players, digital cameras, or the like.

Referring to FIG. 2, the DM server 200 can be connected to the wireless terminal 100 through wireless internet. The wireless terminal 100 includes a DM client and receives the DM service from the DM server 200.

The electronic devices 11 to 15 do not have the function of connecting to the wireless internet, so the electronic devices 11 to 15 cannot not be directly connected with the DM server 200, thereby failing to directly receive the DM service from the DM server 200. Therefore, the electronic devices 11 to 15 receive the DM service from the wireless terminal 100.

To this end, the DM clients are mounted on the electronic devices, respectively. The electronic devices 11 to 15 communicate with the wireless terminal 100 capable of being connected to the DM server through a short-range communication medium, e.g. IR, WLAN, Bluetooth, or the like, or a cable, so as to deliver their DDFs to the wireless terminal 100.

The wireless terminal 100 is connected to the DM server 200 so as to serve as the mobile DM server with respect to the electronic devices 11 to 15. The wireless terminal, i.e. the mobile DM server 200, receives the electronic devices' 11 to 15 DDFs from the neighboring electronic devices 11 to 15 communicating with the mobile DM server 200, and generates a DDF tree with respect to the neighboring electronic devices 11 to 15 using the DDF so as to transmit the generated DDF tree to the DM server 200.

It is preferred that the DDF tree is an MO tree regulated in the OMA-DM Spec. Here, the DM server and the DM client have the data necessary for sharing, which is referred to as the Management Object (MO). The MO is defined as a data structure in which the parameters necessary for being shared in the DM server and the DM client are formed in a tree shape.

Thereafter, the mobile DM server 200 communicates with the DM server 200 so as to provide the neighboring electronic devices 11 to 15 with the DM service. The DM server 200 recognizes information on the MO tree of the neighboring electronic devices 11 to 15 included in the mobile DM server so that the electronic devices can receive not only the provisioning service but also the DM service, such as FUMO, SCOMO, DiagMon, Scheduling, or the like.

Hereinafter, the configuration of the wireless terminal and the electronic device will be described in detail with reference to FIG. 3.

Figure 3:
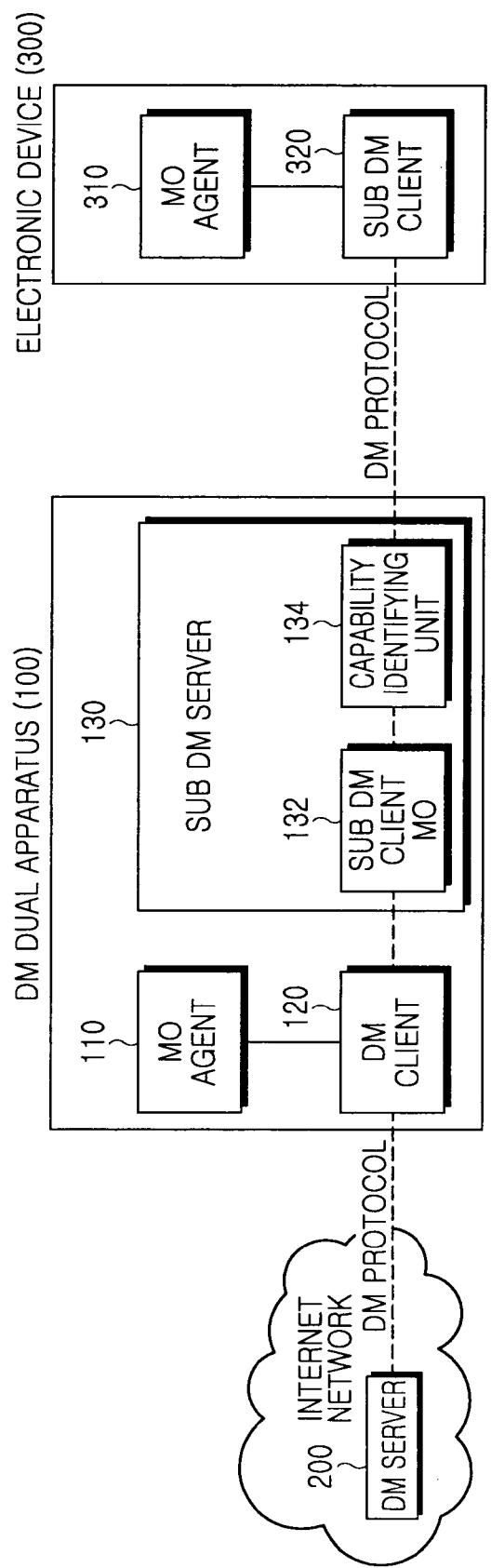
FIG. 3 is a diagram illustrating a configuration of a wireless terminal and an electronic device according to an exemplary embodiment of the present invention.

FIG. 3 is a diagram illustrating the configuration of the wireless terminal and the electronic device according to an exemplary embodiment of the present invention.

As shown in FIG. 3, the system for providing the electronic device with the DM service includes the DM server 200 existing in the internet network, the mobile terminal 100 serving as the DM client as a peer connected to the DM server 200 and also serving as the mobile DM server, and the electronic device 300 mounted with the DM client module connected to a DM dual apparatus 100 through the short-range communication or in wire.

Hereinafter, the mobile terminal 100 functions as the DM client with respect to the DM server 200 and functions as the DM server with respect to the electronic device, so that the mobile terminal 100 can be also called as the DM dual apparatus.

The DM server 200 is subordinated to a network of an actual service provider, provides the device with the communication service desired by the user, and simultaneously manages the device connected to the DM server 200.

Further, the DM server 200 is connected to the wireless device, e.g. the wireless terminal 200 using the wireless media in the licensed broadband, and transmits/receives the MO to/from the wireless device using the OMA DM protocol so as to provide the OMA-DM service.

The MO is the interface in which the DM client and the DM server can access, serving as the data model of the object desired to be managed in the device. The OMA DM Spec requires the use of the MOs registered in the Open Mobile Naming Authority (OMNA).

The MO basically provided from the device according to the OMA DM Spec includes DMAccMO, DevInfoMO, and DevDetailMo. DMAccMO includes information on the connection to the DM server, and DevInfoMO and DevDetailMo includes information of the device. The device desiring to receive the DM service should exchange the MOs with the DM server.

In order to provide the device with the specific DM service through the OMA DM, the DM server should generate the MO related to the specific DM service and provide the device with the generated MO. The MO for providing the DM service currently under the standardization includes FUMO for updating the firmware, SCoMO for managing the software component, DiagMonMO for diagnosing the errors of the terminal, SchedulingMO for managing the schedule of a task of the device, DCMO for managing an enable/disable function for the hardware component of the device, or the like.

The DM dual apparatus connected to the DM server 200 and serving as the mobile DM server includes the DM client 120, the MO agent 110, and a sub DM server 130 as shown in FIG. 3.

The DM client 120 is connected to the DM server 200 of the internet network so as to transmit/receive a DM message to/from the DM server 200.

The MO agent 110 is the system for managing a corresponding MO for every DM service provided from the DM server 200 and actually controlling the device according to the MO. The MO agent 110 can include the agents corresponding to the kind of the MO. For example, the MO agent 110 includes a ScoMo agent, scheduling agent, FUMO agent, DCMO agent, or the like, but is not limited thereto. The construction of the agents can be varied depending on the implementing method.

The sub DM server 130 takes a charge of the function of the mobile DM server and manages the electronic devices connected to the wireless terminal and desiring to receive the DM service. When the sub DM server 130 receives the request of the DM service from the electronic devices 300, the sub DM server 130 identifies if the sub DM server 130 can manage the device. Specifically, the sub DM server 130 authorizes the electronic device 300 and simultaneously identifies one's capability so as to determine whether to provide the corresponding electronic device 300 with the DM service. To this end, the sub DM server 130 includes a sub DM client MO 132 and a capability identifying unit 143. The capability identifying unit 143 can check one's capability, e.g. whether to have the hardware or the software resource capable of functioning as the DM server with respect to the electronic device. Here, the number of the electronic devices capable of receiving the DM service can be determined depending on the identified capability.

Then, the sub DM server 130 manages the connected electronic devices 300 through the sub DM client MO 132. The configuration of the sub DM client MO 132 is illustrated in FIG. 4.

Figure 4:
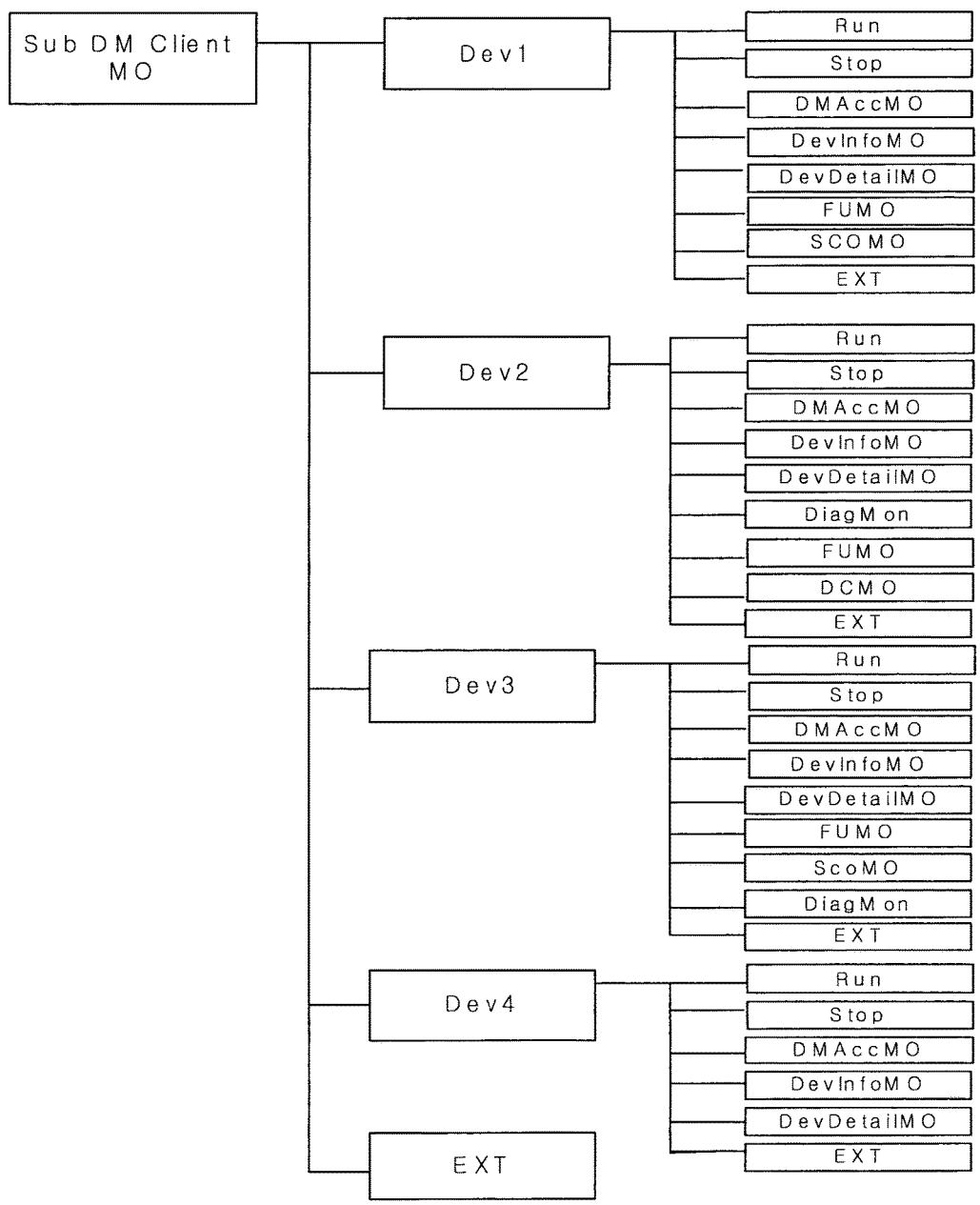
FIG. 4 is a diagram illustrating a configuration of a sub DM client MO according to an exemplary embodiment of the present invention.

FIG. 4 is a diagram illustrating the configuration of the sub DM client MO according to an exemplary embodiment of the present invention.

Referring to FIG. 4, the MO of the service to be provided to the device, the MOs basically supported, and a node for executing the management are included under the object device subjected to the management.

There are nodes for representing each electronic device and an EXT node under the sub DM client MO node. The EXT node is the node for extension, and for generating a Dev node if the device is additionally connected. A run node and a stop node under the each Dev node are required for the DM server to execute and stop the electronic device. The DMAccMO, DevInfoMO, and DevDetailMo nodes are the MOs that should be basically supported for connecting to the DM server and receiving the management. Therefore, the run, stop, DMAccMO, DevInfoMO, and DevDetailMo nodes are the nodes, as the default, that should exist under each of the connecting devices. Besides, the MOs additionally exist for every supporting DM service. Whether or not to support the specific DM service can be differentiated depending on an accounting policy or a characteristic of the hardware of the electronic device. The sub DM client Mo is generated in the sub DM server 130 before the electronic device receives the DM service and the sub-nodes for each device are delivered to the corresponding electronic device using the DM protocol.

The electronic device 300 desiring to receive the DM service should be mounted with the sub DM client 320. The sub DM client 320 is connected to the sub DM server 130 of the DM dual apparatus so as to establish the DM session. The electronic device 300 includes the MO agent 310 similarly with the wireless terminal. The MO agent 310 manages the corresponding MO for every DM service and actually controls the device according to the MO.

The MO agent 310 of the electronic device 300 has a configuration and an operation similar with that of the MO agent 110 of the wireless terminal 100, thereby omitting the detailed description.

Hereinafter, the message flow between the DM server, the DM dual apparatus, and the electronic device in the system providing the electronic device with the DM service according to the exemplary embodiment of the present invention will be described.

Figure 5:
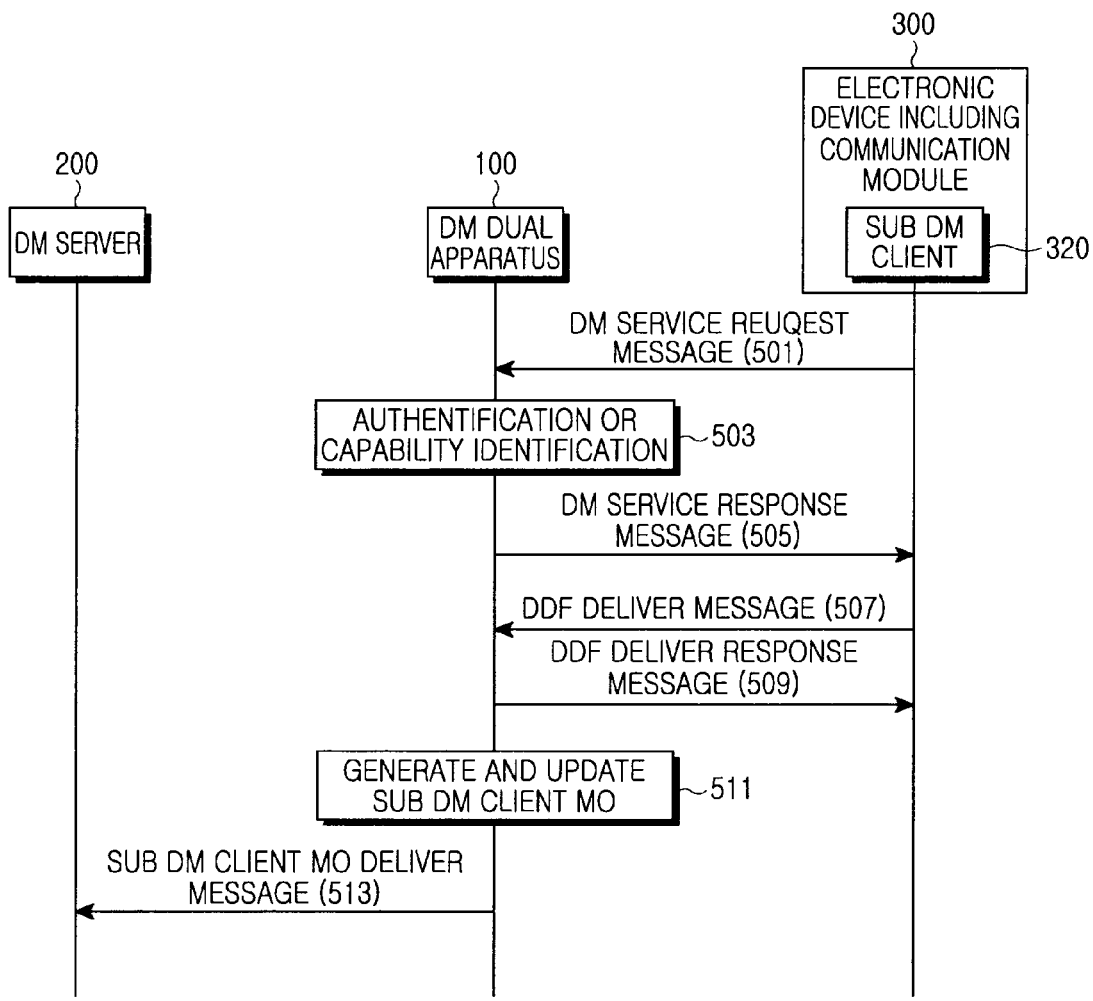
FIG. 5 is a diagram illustrating a procedure of registering an electronic device for providing a DM service according to an exemplary embodiment of the present invention.

FIG. 5 is a diagram illustrating a procedure of registering the electronic device for providing the DM service according to an exemplary embodiment of the present invention.

When the electronic device 300 mounted with the sub DM client 320 desires to receive the DM service, the electronic device 300 should register one's MO information to the DM server 200. According to the present invention, the electronic device 300 registers one's MO information to the DM server 200 through the DM dual apparatus 100.

At this time, the electronic device 300 transmits one's information to the DM dual apparatus 100 in the form of the DDF. Under the current OMA-DM standard, the DM client provides the DM service provider, i.e. the DM server, with the DDF. The MO tree information including the MOs stored in the device is represented in the DDF. The DM dual apparatus 100 generates the sub DM client MO having the form shown in FIG. 4 based on the DDF and delivers the generated sub DM client MO to the DM server 200. Further, the DM dual apparatus 100 stores the generated sub DM client MO in an inside block so that the stored sub DM client MO is used as base information for providing the DM service later.

Referring to FIG. 5, when the electronic device 300 desires to receive the DM service, the electronic device 300 transmits a DM service request message for requesting the DM service to the DM dual apparatus 100. The example of the elements of the DM service request message is illustrated in FIG. 6.

As shown in FIG. 6, the DM service request message includes a Message ID representing that the corresponding message is the DM service request message, a Session ID representing an ID of the management session, a Target representing an ID of the DM dual apparatus serving as a destination of the corresponding message, a Source representing an ID of the electronic device serving as a source of the corresponding message, a Credential representing an ID and a password of the electronic device serving as information for authorizing the electronic device, and DevInfo representing information on the electronic device including an ID of the electronic device, a manufacturer, a name of a manufactured model, and support languages.

When the DM dual apparatus 100 receives the DM service request message, the DM dual apparatus 100 authorizes the corresponding electronic device using the information included in the DM service request message in step 503. At this time, as described above, the DM dual apparatus 100 identifies one's capabilities, such that the DM dual apparatus 100 checks whether or not to have the hardware or the software resource capable of functioning as the DM server with respect to the electronic device.

Subsequently, the DM dual apparatus 100 transmits a DM service response message as the response to the DM service request message to the electronic device 300 in step 505.

An example of the inner elements of the DM response message is shown in FIG. 7, which is similar with the elements of the DM service request message shown in FIG. 6. Further, after the DM dual apparatus 100 performs the process of the authentication and the identification of one's capability, the DM response message includes a result code element including a result value according to the above processes.

If the DM session serving as a route for the DM service is established, the electronic device 300 transmits a DDF deliver message for transmitting the DDF to the DM dual apparatus 100 in step 507. An example of the elements of the DDF deliver message is shown in FIG. 8.

As shown in FIG. 8, the DDF deliver message includes a Message ID representing that the corresponding message is the DDF deliver message, a Session ID representing an ID of the management session, and a DDFDATA representing a content of the DDF.

When the DM dual apparatus 100 receives the DDF deliver message from the electronic device 300, the DM dual apparatus 100 transmits a DDF deliver response message as the response to the received DDF deliver message to the electronic device 300. An example of the elements of the DDF deliver response message is shown in FIG. 9.

As shown in FIG. 9, the DDF deliver response message includes a Message ID representing that the corresponding message is the DDF deliver response message, a Session ID representing an ID of the management session, and a result code of the delivered DDF.

As such, if the electronic devices desires to receive the OMA DM service of the DM service provider, i.e. the DM server, the DM dual apparatus 100 receives the DDF of the electronic devices managed by the DM dual apparatus 100.

Thereafter, the DM dual apparatus 100 generates the sub DM client MO using the DDF of the electronic devices or if the sub DM client MO has been already generated, the DM dual apparatus 100 updates the sub DM client MO in step 511. The DM dual apparatus 100 transmits the sub DM client MO to the DM server 200 existing in a backbone network in step 513. The message used at this time is a sub DM client MO transmission message. An example of the elements included in the sub DM client MO transmission message is shown in FIG. 10.

Referring to FIG. 10, the sub DM client MO transmission message includes a Message ID representing that the corresponding message is the sub DM client MO message, a Session ID representing an ID of the management session, and the sub DM client MO representing a content of the sub DM client MO.

Hereafter, a method for providing the electronic device with the DM service from the DM server 200 through the DM dual apparatus 100 will be described.

The method for providing the DM service according to the present invention includes a method in which the mobile DM server generates the MO for managing the electronic device so as to deliver the generated MO to the DM server and a method in which the DM server delivers the MO generated for managing the electronic device to the electronic device through the mobile DM server.

Figure 11:
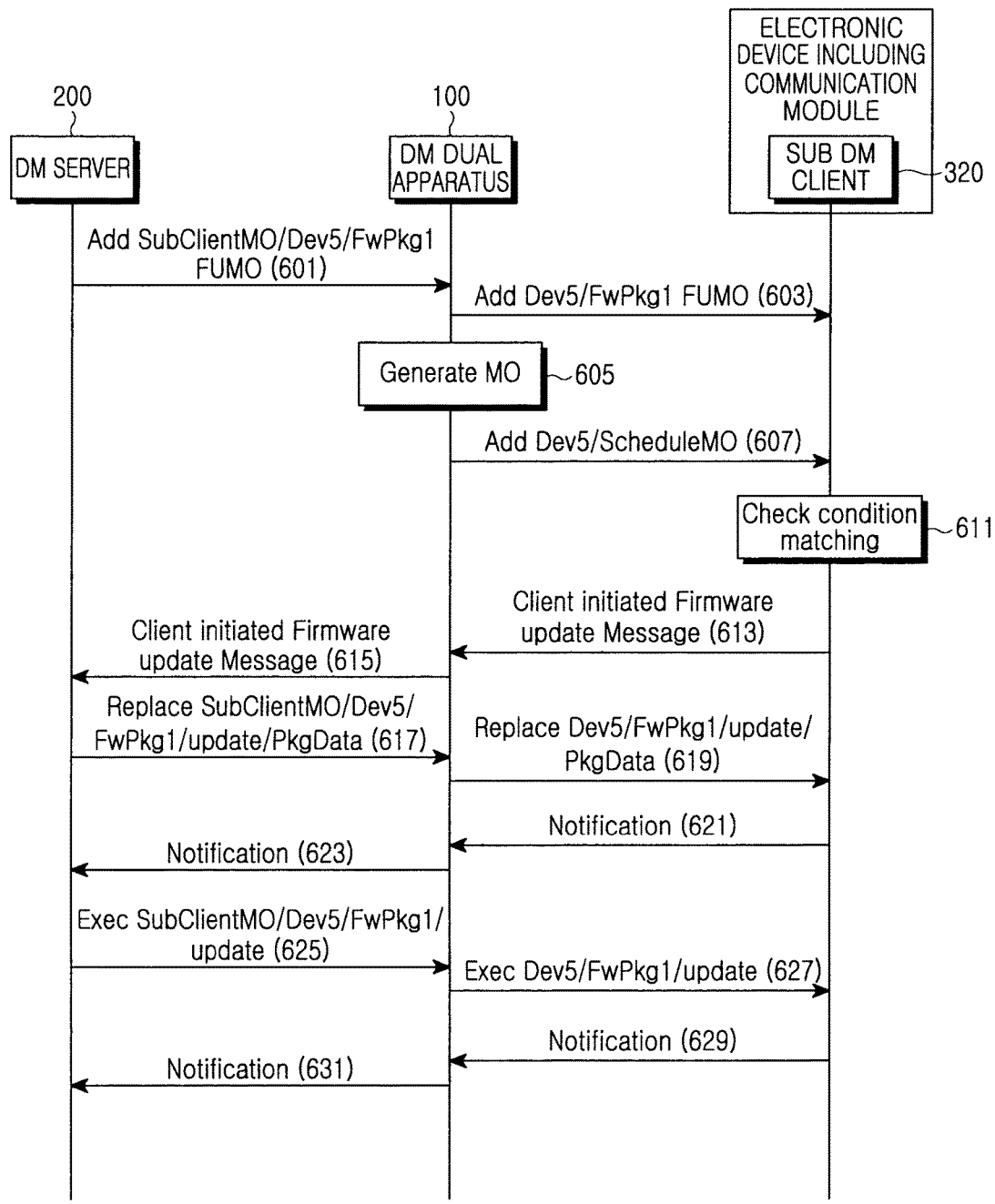
FIG. 11 is a diagram illustrating a method for providing an electronic device with a DM service according to an exemplary embodiment of the present invention.

FIG. 11 is a diagram illustrating the method for providing the electronic device with the DM service according to an exemplary embodiment of the present invention. FIG. 11 illustrates a method in which the mobile DM server, i.e. the DM dual apparatus, directly manages the electronic device.

Hereinafter, the operation of the present invention will be described with reference to an exemplary embodiment in which the mobile DM server uses the schedule of automatically updating the firmware of the electronic device Device 5 at 12 a.m. for the OMA DM, so as to manage the electronic device. The firmware is provided from the manufacturer of the electronic device so that the firmware should be updated through the internet network. Hereinafter, it is on the assumption in the exemplary embodiment that the FUMO is generated in the DM server and delivered to the terminal.

Referring to FIG. 11, the DM server 200 generates the FUMO used for managing the firmware of the electronic device 300, e.g. Device 5, and instructs the DM dual apparatus 100 to add the generated FUMO to the sub DM client MO in step 601. Correspondingly, the DM dual apparatus 100 adds the FUMO to one's sub DM client MO 132 and delivers the FUMO to the electronic device 300 in step 603. Then, the DM dual apparatus 100 generates a scheduling MO including the contents of automatically updating the firmware of the electronic device Device 5 at 12 a.m. in step 605, and delivers the generated scheduling MO to the electronic device 300 in step 607. The electronic device 300 adds the received scheduling MO to one's sub DM client MO and continuously checks if the condition for updating the firmware is satisfied in step 611.

The condition for updating the firmware, e.g. a current time is 12 a.m., is satisfied, the electronic device 300 automatically transmits a firmware update request message to the DM dual apparatus 100 using the DM protocol in step 613. Then, the DM dual apparatus 100 transmits the firmware update request message to the DM server 200 using the DM protocol in step 615.

If the DM server 200 receives the firmware update request message, the DM server 200 checks if there is a new version firmware of the corresponding electronic device according to the firmware update request message. If the new-version firmware exists, the DM server 200 transmits a message for updating the firmware of the electronic device to the DM dual apparatus 100 using a replace DM command or an exec DM command in step 617 or step 625.

If the DM dual apparatus 100 receives the message for updating the firmware, the DM dual apparatus 100 delivers the received message for updating the firmware to the electronic device 300 in step 619 or step 627. If the electronic device 300 receives the message for updating the firmware, the electronic device 300 transmits a notification message representing an update result to the DM dual apparatus 100 in step 621 or step 629. The DM dual apparatus 100 delivers the notification message to the DM server 200 in step 623 or step 631. The characteristic of the transmission of the notification message by the electronic device 300 is optional in the implementation, which can be identically applied to the exemplary embodiments described later.

Hereinafter, the exemplary embodiment of managing the electronic device by the DM server through the DM dual apparatus will be described. The DM service is implemented through delivering the DM message using the DM protocol. The method for managing the electronic device by the DM server through the DM dual apparatus is divided into a synchronous scheme and an asynchronous scheme depending on the scheme of delivering the DM message to the electronic device. Further, the method for providing the electronic device with the DM service by the synchronous scheme can be divided into a downside scheme and an upside scheme.

Figure 12:
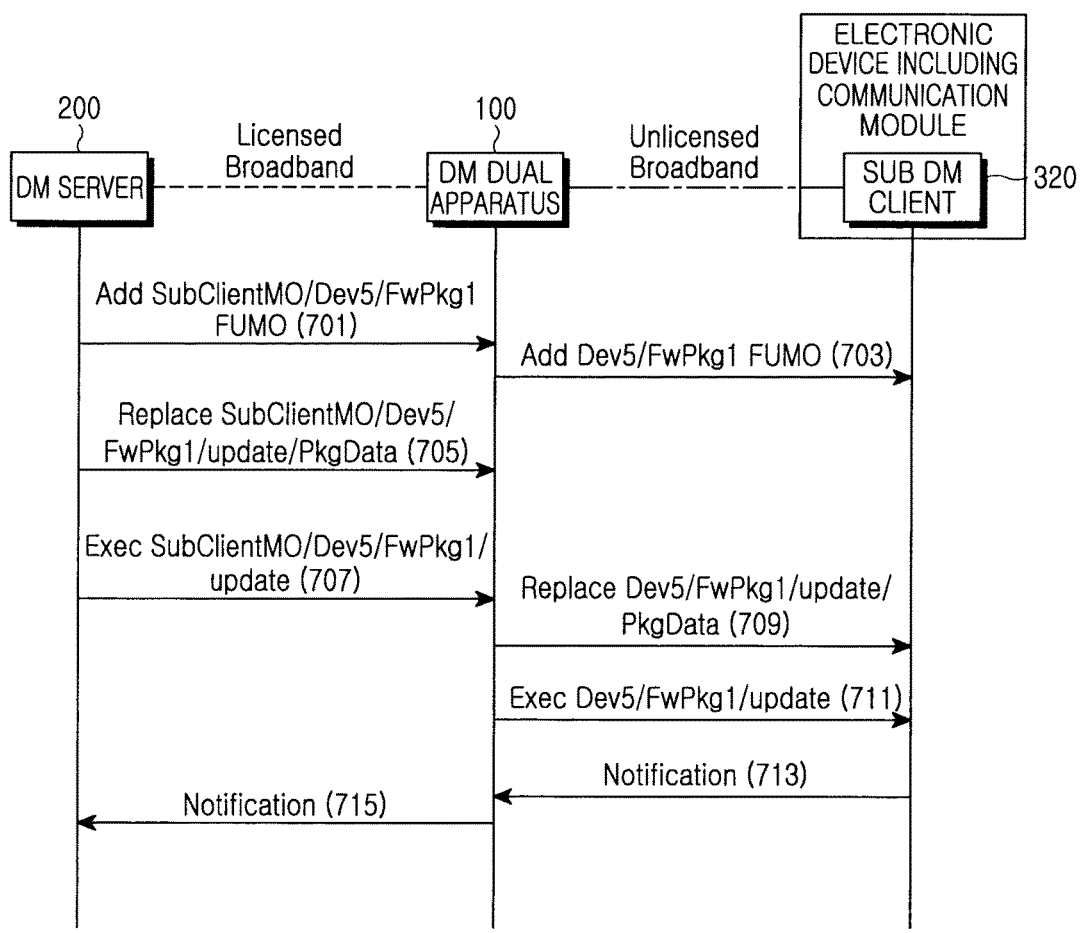
FIG. 12 is a diagram illustrating a method for providing an electronic device with a DM service by a downside scheme in a synchronous scheme according to an exemplary embodiment of the present invention.

FIG. 12 is a diagram illustrating the method for providing the electronic device with the DM service by the downside scheme in the synchronous scheme according to an exemplary embodiment of the present invention. If the DM dual apparatus 100 receives the commands with respect to the MO of the electronic device from the DM server 200 through the licensed channel, the DM dual apparatus 100 delivers the received commands to the electronic device 300 so that the DM service is implemented. The commands with respect to the MO of the electronic device are delivered from the DM server to the electronic device 300 via the DM dual apparatus 100 in the downside scheme.

Referring to FIG. 12, in order to deliver the new-version firmware of the electronic device, the DM server 200 generates the FUMO used for managing the firmware of the electronic device 300, e.g. Device 5, and transmits the generated FUMO to the DM dual apparatus 100 in step 701. The DM dual apparatus 100 delivers the FUMO to the electronic device 300 in step 703.

Subsequently, the DM server 200 transmits the message for updating the firmware of the electronic device to the DM dual apparatus 100 using the replace DM command or the exec DM command updating the firmware in step 705 or step 707. The DM dual apparatus 100 delivers the FUMO to the electronic device 300 in step 709 or step 711. Correspondingly, the firmware of the electronic device 300 can be updated.

If the electronic device 300 receives the message for updating the firmware, the electronic device 300 transmits the notification message representing the update result to the DM dual apparatus 100 in step 713. The DM dual apparatus 100 delivers the notification message to the DM server 200 in step 715.

Figure 13:
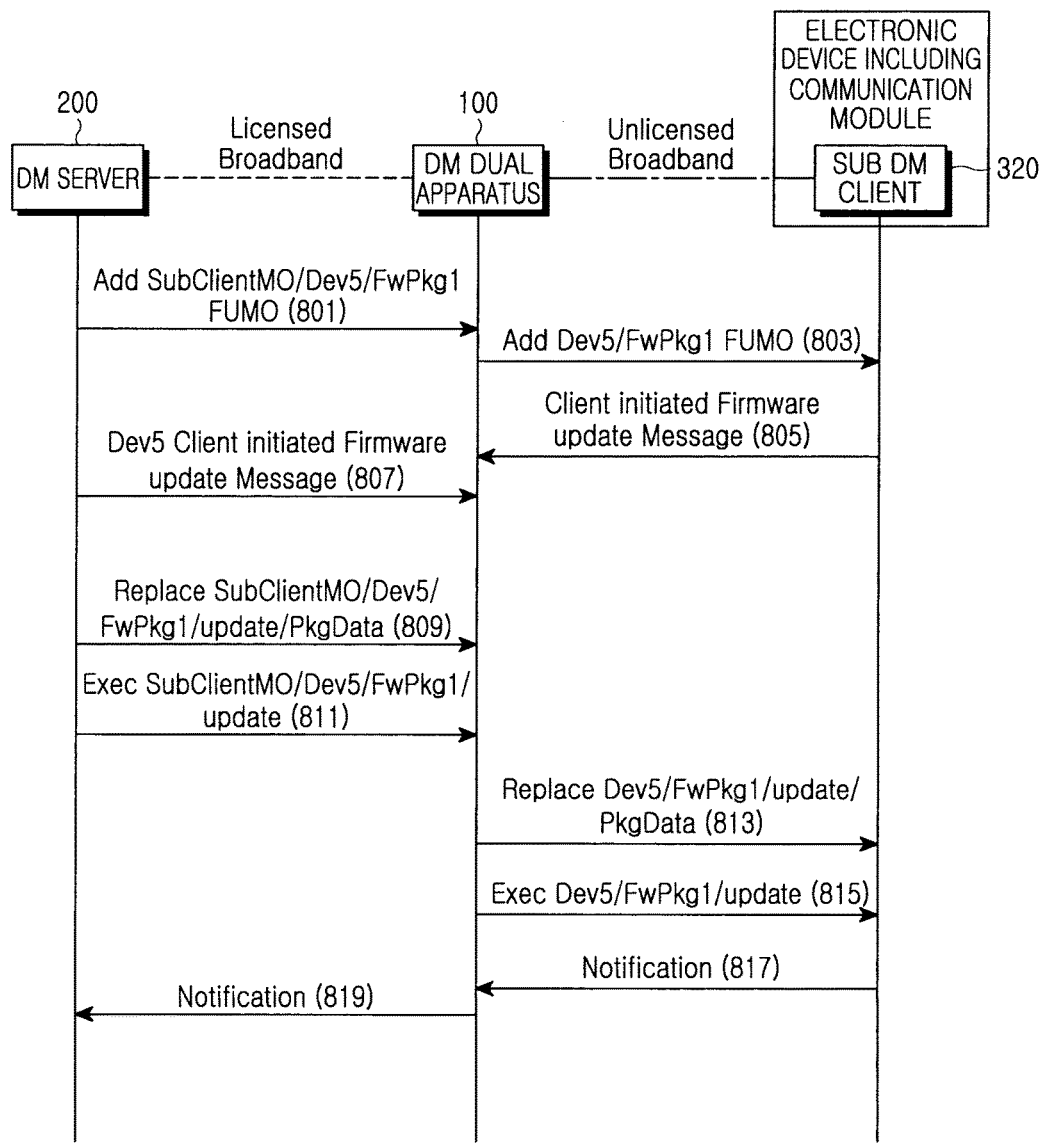
FIG. 13 is a diagram illustrating a method for providing an electronic device with a DM service by an upside scheme in a synchronous scheme according to an exemplary embodiment of the present invention.

FIG. 13 is a diagram illustrating the method for providing the electronic device with the DM service by the upside scheme in a synchronous scheme according to an exemplary embodiment of the present invention.

According to the upside scheme, the DM server does not unilaterally deliver the message to the electronic device, but the electronic device can request the firmware update due to the problems of the electronic device or other reasons.

Referring to FIG. 13, in order to manage the firmware of the electronic device, the DM server 200 generates the FUMO used for managing the firmware of the electronic device 300, e.g. Device 5, and transmits the generated FUMO to the DM dual apparatus 100 in step 801. The DM dual apparatus 100 delivers the FUMO to the electronic device 300 in step 803.

Subsequently, if the electronic device 300 desires to update one's firmware, the electronic device 300 automatically transmits the firmware update request message to the DM dual apparatus 100 using the DM protocol. Correspondingly, the DM dual apparatus 100 transmits the firmware update request message to the DM server 200 using the DM protocol in step 807.

If the DM server 200 receives the firmware update request message, the DM server 200 checks if there is a new version for the firmware of the corresponding electronic device according to the firmware update request message. If the new-version firmware exists, the DM server 200 transmits message for updating the firmware of the electronic device to the DM dual apparatus 100 using the replace DM command or the exec DM command in step 809 and step 811.

If the DM dual apparatus 100 receives the message for updating the firmware, the DM dual apparatus 100 delivers the received message for updating the firmware to the electronic device 300 in step 813 or step 815. If the electronic device 300 receives the message for updating the firmware, the electronic device 300 delivers the notification message representing the update result to the DM dual apparatus 100 in step 817. The DM dual apparatus 100 transmits the notification message to the DM server 200 in step 819.

Figure 14:
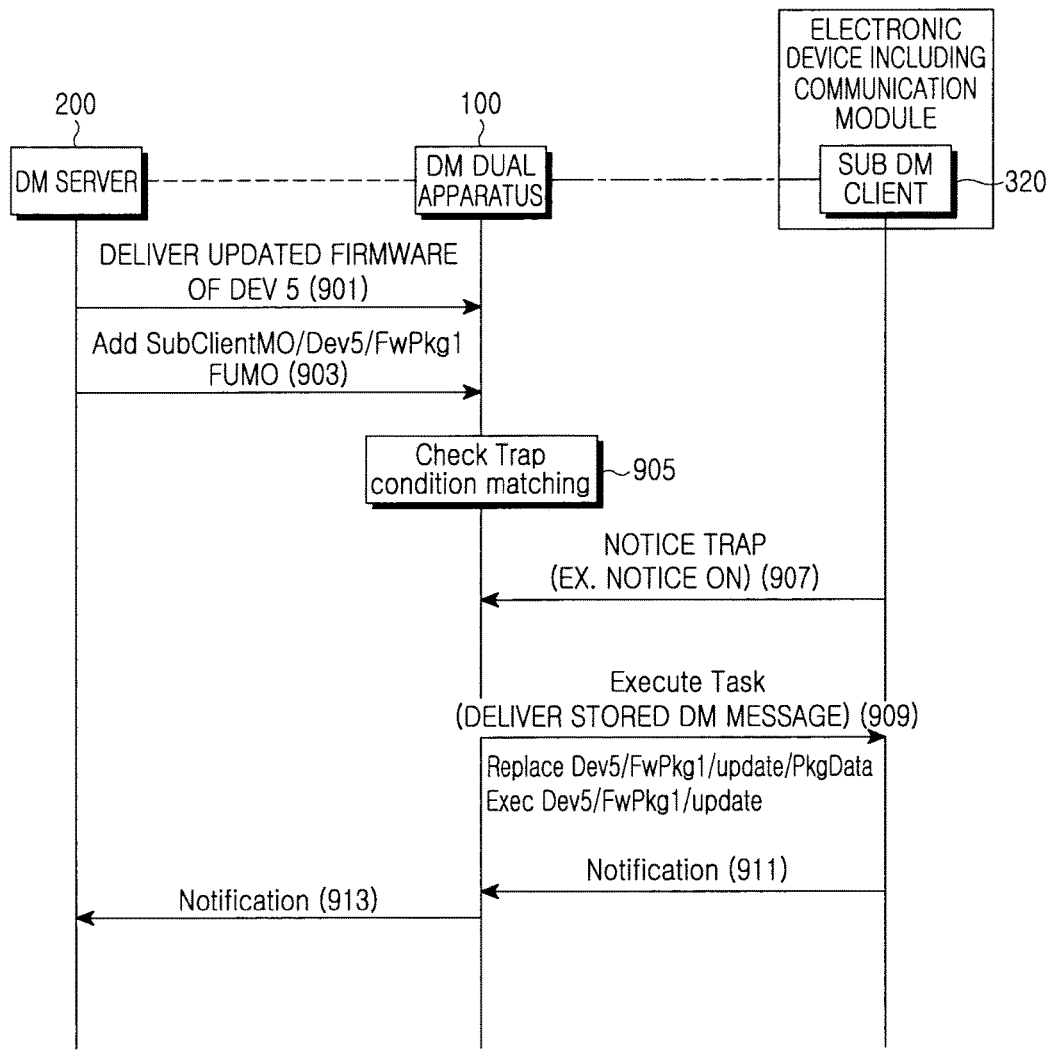
FIG. 14 is a diagram illustrating a method for providing an electronic device with a DM service by an asynchronous scheme according to an exemplary embodiment of the present invention.

FIG. 14 is a diagram illustrating the method for providing the electronic device with the DM service by an asynchronous scheme according to an exemplary embodiment of the present invention.

According to the asynchronous scheme, if the command message related to the neighboring electronic device is delivered from the DM server, the mobile DM server does not immediately deliver the commands to the electronic device, but stores the commands. Later, the mobile DM server performs the command and delivers the result value to the DM server. The said method can use the scheduling of the sub WI currently discussed in the DM working group.

Referring to FIG. 14, the DM server 200 delivers the updated firmware of the electronic device Dev 5 to the DM dual apparatus 100 in advance in step 901.

Then, the DM server 200 generates the schedule MO for scheduling the update of the firmware so as to deliver the generated schedule MO to the DM dual apparatus 100 in step 903. When the DM dual apparatus 100 receives the schedule MO from the DM server 200, the DM dual apparatus 100 stores and installs the schedule MO.

Figure 15:
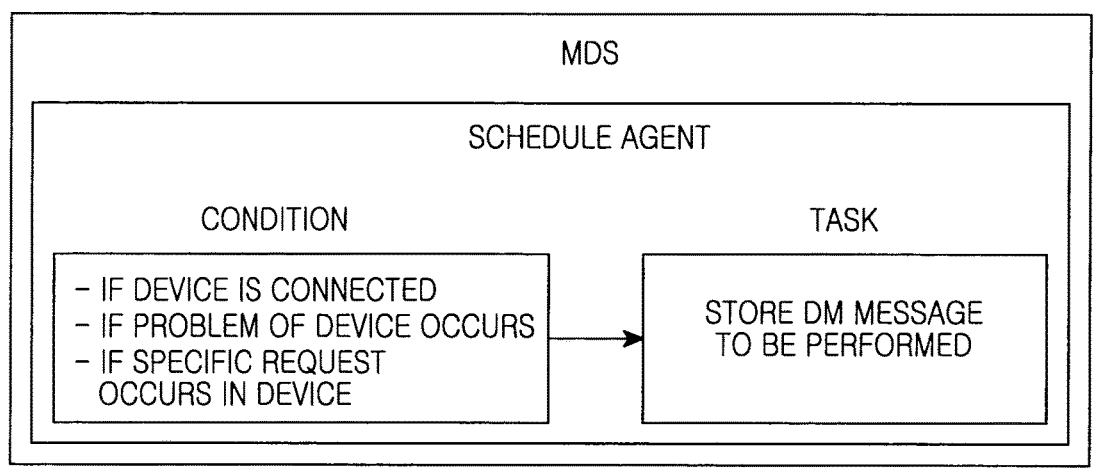
FIG. 15 is a diagram illustrating a configuration of a scheduling agent according to an exemplary embodiment of the present invention.

FIG. 15 is a diagram illustrating a configuration of a scheduling agent according to an exemplary embodiment of the present invention. Referring to FIG. 15, the scheduling agent includes a condition and a task performed according to the satisfaction of the condition. The scheduling agent stores the commands delivered from the DM server 200 in the task and performs the corresponding task when the condition is satisfied. Here, the condition may include a case where the electronic device is connected, a case where a problem of the electronic device occurs, or the like. The above method assumes that the mobile DM server receives the new-version firmware of the electronic device in advance and stores it like step 901.

Subsequently, the DM dual apparatus 100 continuously checks if the condition for updating the firmware occurs in step 905.

For example, if a content of the condition is a trap of the electronic device being on, the DM dual apparatus 100 waits for a corresponding trap notification message to be delivered from the electronic device. If the corresponding trap notification message is delivered in step 907, the DM dual apparatus 100 delivers the DM messages stored in the task node of the schedule MO for updating the firmware to the electronic device 300 in step 909.

The electronic device 300 delivers the notification message representing the task performance result to the DM dual apparatus 100 in step 911, and the DM dual apparatus 100 transmits the notification message to the DM server 200 in step 913. Whether or not to notify the task performance result can be varied according to the implementation.

As such, the present invention enables the apparatus which does not directly communicate with the internet network to wirelessly receive the OMA DM service. There is a method for providing a compact-sized electronic device with the OMA-DM service in which the compact-sized electronic device, such as the conventional MP3 or the digital camera, is directly connected to the DM server of the internet network. However, every compact-sized electronic device has not been developed to be connected to the internet network. If the electronic device is directly connected to the DM server through the internet network, the licensed broadband is used, so that the user should pay the communication use charge to the service provider and the service delay in communication may occur. However, according to the present invention, the device is connected to the neighboring wireless communication device, such as a cellular phone having a function of the mobile DM server, so that the device can receive the DM service. That is, the inconvenience caused by the communication charges and the service delay can be solved.

Further, there is a method for receiving the DM service in which the user directly visits a current customer care center, but the method is inconvenient for the user. Therefore, the method according to the present invention can solve such an inconvenience and simultaneously the user can conveniently receive the DM service.

While the invention has been shown and described with reference to certain exemplary embodiments thereof, it will be understood by those skilled in the art that various changes in form and details may be made therein without departing from the spirit and scope of the invention as defined by the appended claims. For example, the present invention can be employed in every portable terminal.

The invention claimed is:

1. A method for providing a Device Management (DM) service to at least one electronic device by a wireless terminal connected with a DM server, the method comprising:
    establishing a DM session for a connection between the wireless terminal and an electronic device;
    receiving a Device Description File (DDF) related to the electronic device, from the electronic device, and transmitting the DDF to the DM server such that the electronic device is registered in the DM server;
    if a Management Object (MO) related to the electronic device is generated based on the DDF by the DM server, receiving the MO related the electronic device from the DM server, wherein the MO related to the electronic device is related to an update of firmware, management of a software component, diagnosis of an error, management of a task schedule, or management of a hardware component;
    controlling the electronic device to notify that a condition for executing an operation related to the MO is satisfied, wherein the condition for executing the operation related to the MO is received from the DM server;
    determining whether a message indicating that the condition for executing the operation related to the MO is satisfied is received by the wireless terminal from the electronic device; and
    if the message is received from the electronic device, transmitting the MO and a command for the operation related to the MO to the electronic device.

2. The method of claim 1, further comprising authorizing the electronic device before establishing the DM session.

3. The method of claim 1, further comprising managing, by the DM server, a predetermined component of the electronic device using the MO.

4. A wireless terminal for providing a Device Management (DM) service to at least one electronic device, the wireless terminal comprising:
    a transceiver,
    wherein the wireless terminal is configured to:
        establish a DM session for a connection between the wireless terminal and an electronic device,
        control the transceiver to receive, from the electronic device, a Device Description File (DDF) related to the electronic device, and transmit the DDF to a DM server such that the electronic device is registered in the DM server,
        if a Management Object (MO) related to the electronic device is generated based on the DDF by the DM server, receive the MO related to the electronic device from the DM server, wherein the MO related to the electronic device is related to an update of firmware, management of a software component, diagnosis of an error, management of a task schedule, or management of a hardware component,
        control the electronic device to notify that a condition for executing the operation related to the MO is satisfied, wherein the condition for executing an operation related to the MO is received through the transceiver from the DM server,
        determine whether a message indicating that the condition for executing the operation related to the MO is satisfied is received by the wireless terminal from the electronic device, and
        if the message is received from the electronic device, control the transceiver to transmit the MO related to the electronic device and a command for the operation related to the MO to the electronic device.

5. The wireless terminal of claim 4, wherein the wireless terminal is further configured to authorize the electronic device before the DM session is established.

6. The wireless terminal of claim 4, wherein the DM server is configured to manage a predetermined component of the electronic device using the MO.

7. The wireless terminal of claim 4, wherein the wireless terminal is further configured to:
    if a request for updating firmware of the electronic device is received from the electronic device through the transceiver,
    receive, from the DM server, data for updating the firmware of the electronic device through the transceiver, and
    transmit, to the electronic device, the data for the firmware of the electronic device through the transceiver.

8. The method of claim 1, wherein receiving the MO related to the electronic device comprises receiving, from the DM server, data for updating a firmware of the electronic device, and
    wherein transmitting the MO and the command for the operation related to the MO comprises transmitting, to the electronic device, the data for the firmware of the electronic device.

9. The method of claim 1, further comprising:
if a request for updating firmware of the electronic device is received from the electronic device, receiving, from the DM server, data for updating the firmware of the electronic device; and
transmitting, to the electronic device, the data for the firmware of the electronic device.

\* \* \* \* \*